United States Patent
Ando et al.

(10) Patent No.: US 7,222,153 B2
(45) Date of Patent: May 22, 2007

(54) METHOD OF ACCUMULATING APPLIANCE LOCATED STATES AND APPARATUS USING THE SAME

(75) Inventors: Nobuyoshi Ando, Sagamihara (JP); Katsumi Kawano, Kawasaki (JP); Nobuhisa Kobayashi, Hitachinaka (JP); Naoki Mitsuyoshi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 10/020,116

(22) Filed: Dec. 18, 2001

(65) Prior Publication Data
US 2002/0091812 A1 Jul. 11, 2002

(30) Foreign Application Priority Data
Dec. 20, 2000 (JP) ............................. 2000-391831

(51) Int. Cl.
*G06F 15/16* (2006.01)
*G06F 165/00* (2006.01)

(52) U.S. Cl. .................. 709/203; 709/224; 709/220; 342/457; 364/443

(58) Field of Classification Search ............... 370/255, 370/256, 257, 258, 254; 709/223, 224, 226, 709/220, 227, 203, 228; 715/736; 702/59; 700/275, 302, 85; 714/39; 364/443; 372/457, 372/465
See application file for complete search history.

(56) References Cited

U.S. PATENT DOCUMENTS

| | | | |
|---|---|---|---|
| 5,552,989 A * | 9/1996 | Bertrand | 701/200 |
| 5,886,643 A * | 3/1999 | Diebboll et al. | 709/224 |
| 6,157,621 A * | 12/2000 | Brown et al. | 370/310 |
| 6,259,404 B1 * | 7/2001 | Parl et al. | 342/457 |
| 6,898,618 B1 * | 5/2005 | Slaughter et al. | 709/203 |
| 2003/0028270 A1 * | 2/2003 | Peterson et al. | 700/83 |
| 2003/0028271 A1 * | 2/2003 | Peterson | 700/85 |
| 2005/0013462 A1 * | 1/2005 | Rhoads | 382/100 |

FOREIGN PATENT DOCUMENTS

JP 05-048623 A 2/1993

\* cited by examiner

*Primary Examiner*—Khanh Dinh
(74) *Attorney, Agent, or Firm*—Antonelli, Terry, Stout & Kraus, LLP.

(57) ABSTRACT

An appliance located states accumulating method includes the steps of, receiving state information indicating operating state changes of the appliances constituted of a distributed computer through a network, calculating an occurrence time difference from the state changes occurred in the appliances in accordance with occurrence time information indicative of occurrence times of the state changes included in the state information, and calculating the positional relation of the positions, where the appliances occur the state changes, from the calculated occurrence time difference, thereby accumulating the positional relation of the installed appliances.

6 Claims, 11 Drawing Sheets

FIG.7

| APPLIANCE ADDRESS PORTION | APPLIANCE KIND PORTION |
|---|---|
| 123 | 1 |
| 35 | 3 |
| 68 | 4 |
| 205 | 3 |

FIG.8

| TIME PORTION | APPLIANCE ADDRESS PORTION |
|---|---|
| 03:23:10 | 35 |
| 03:23:11 | 68 |
| 03:23:12 | 35 |
| 03:23:15 | 123 |
| 03:23:20 | 205 |
| null | null |

FIG.9

| | APPLIANCE ADDRESS OF TV 1 | APPLIANCE ADDRESS OF TV 2 | APPLIANCE ADDRESS OF AIR CONDITIONER 3 | APPLIANCE ADDRESS OF AIR CONDITIONER 4 | APPLIANCE ADDRESS OF AIR CONDITIONER 5 | APPLIANCE ADDRESS OF ILLUMINATION 6 | APPLIANCE ADDRESS OF ILLUMINATION 7 | APPLIANCE ADDRESS OF ILLUMINATION 8 | .... | APPLIANCE ADDRESS OF REFRIGERATOR 16 |
|---|---|---|---|---|---|---|---|---|---|---|
| APPLIANCE ADDRESS OF TV 1 | / | 0.01 | 0.005 | 0.5 | 0.001 | 0.1 | 0.06 | 0.015 | .... | 0.001 |
| APPLIANCE ADDRESS OF TV 2 | 0.01 | / | (0.01) | 0.01 | 0.01 | 0.01 | 0 | 0.01 | .... | 0 |
| APPLIANCE ADDRESS OF AIR CONDITIONER 3 | 0.005 | 0.01 | / | 0.01 | 0.01 | 0.6 | 0.001 | 0 | .... | 0.4 |
| APPLIANCE ADDRESS OF AIR CONDITIONER 4 | 0.5 | 0.01 | 0.01 | / | 0 | 0.1 | 0.5 | 0.06 | .... | 0.01 |
| APPLIANCE ADDRESS OF AIR CONDITIONER 5 | 0.001 | 0.01 | 0.01 | 0 | / | 0.01 | 0.01 | 0.4 | .... | 0 |
| APPLIANCE ADDRESS OF ILLUMINATION 6 | 0.1 | 0.01 | 0.6 | 0.1 | 0.01 | / | 0.001 | 0.01 | .... | 0.5 |
| APPLIANCE ADDRESS OF ILLUMINATION 7 | 0.06 | 0 | 0.001 | 0.5 | 0.01 | 0.001 | / | 0.001 | .... | 0.01 |
| APPLIANCE ADDRESS OF ILLUMINATION 8 | 0.015 | 0.01 | 0 | 0.06 | 0.4 | 0.01 | 0.001 | / | .... | 0.01 |
| ... | ... | ... | ... | ... | ... | ... | ... | ... | ... | ... |
| APPLIANCE ADDRESS OF REFRIGERATOR 16 | 0.001 | 0 | 0.4 | 0.01 | 0 | 0.5 | 0.01 | 0.01 | .... | / |

320

| APPLIANCE GROUP | APPLIANCE ADDRESS LIST | ROOM KIND |
|---|---|---|
| 1 | 1, 4, 7 | 1 |
| 2 | 3, 6, 10, 16 | 2 |
| 3 | 5, 8 | 3 |

FIG.13

| | TV1 | TV2 | AC3 | AC4 | AC5 | Illum6 | Illum7 | Illum8 | .... | Refrig16 |
|---|---|---|---|---|---|---|---|---|---|---|
| APPLIANCE ADDRESS OF REFRIGERATOR 16 | 0.001 | 0 | 0.4 | 0.01 | 0 | 0.5 | 0.01 | 0.01 | .... | / |
| ⋮ | ⋮ | ⋮ | ⋮ | ⋮ | ⋮ | ⋮ | ⋮ | ⋮ | ⋮ | ⋮ |
| APPLIANCE ADDRESS OF ILLUMINATION 8 | 0.015 | 0.01 | 0 | 0.06 | 0.4 | 0.01 | 0.001 | / | .... | 0.01 |
| APPLIANCE ADDRESS OF ILLUMINATION 7 | 0.6 | 0 | 0.001 | 0.5 | 0.01 | 0.001 | / | 0.001 | .... | 0.01 |
| APPLIANCE ADDRESS OF ILLUMINATION 6 | 0.1 | 0.01 | 0.6 | 0.1 | 0.01 | / | 0.001 | 0.01 | .... | 0.5 |
| APPLIANCE ADDRESS OF AIR CONDITIONER 5 | 0.001 | 0.01 | 0.01 | 0 | / | 0.01 | 0.01 | 0.4 | .... | 0 |
| APPLIANCE ADDRESS OF AIR CONDITIONER 4 | 0.5 | 0.01 | 0.01 | / | 0 | 0.1 | 0.5 | 0.06 | .... | 0.01 |
| APPLIANCE ADDRESS OF AIR CONDITIONER 3 | 0.005 | 0.01 | / | 0.01 | 0.01 | 0.6 | 0.001 | 0 | .... | 0.4 |
| APPLIANCE ADDRESS OF TV 2 | 0.01 | / | 0.01 | 0.01 | 0.01 | 0.01 | 0 | 0.01 | .... | 0 |
| APPLIANCE ADDRESS OF TV 1 | / | 0.01 | 0.005 | 0.5 | 0.001 | 0.1 | 0.6 | 0.015 | .... | 0.001 |
| | APPLIANCE ADDRESS OF TV 1 | APPLIANCE ADDRESS OF TV 2 | APPLIANCE ADDRESS OF AIR CONDITIONER 3 | APPLIANCE ADDRESS OF AIR CONDITIONER 4 | APPLIANCE ADDRESS OF AIR CONDITIONER 5 | APPLIANCE ADDRESS OF ILLUMINATION 6 | APPLIANCE ADDRESS OF ILLUMINATION 7 | APPLIANCE ADDRESS OF ILLUMINATION 8 | .... | APPLIANCE ADDRESS OF REFRIGERATOR 16 |

320

| APPLIANCE ADDRESS PORTION | APPLIANCE KIND PORTION | POSITION INFORMATION PORTION |
|---|---|---|
| 123 | 1 | 2 |
| 35 | 3 | null |
| 68 | 4 | 1 |
| 205 | 3 | null |

METHOD OF ACCUMULATING APPLIANCE LOCATED STATES AND APPARATUS USING THE SAME

BACKGROUND OF THE INVENTION

1. Field of the Invention

The invention relates to a method of accumulating located states of appliances in a distributed computer system in which a plurality of appliances are mutually connected through a network and to an apparatus using such a method. More particularly, the invention relates to household appliances and facility appliances which are connected to a home network.

2. Description of the Related Art

In recent years, the number of kinds and the number of appliances connected to a home network system have been increased. There are cases where the appliances are installed at positions where the resident (user) is not aware of, the user himself directly connects the appliances to the network, and the like. It is becoming difficult to grasp which kinds of appliances are installed at which places. If the installing positions are found, for example, in the case where a sensor fails, it is possible to rapidly and easily find a place of the failed sensor among a number of sensors installed in a house. If the appliances can be classified every room from the installing positions, for instance, it is possible to utilize the system for an energy saving control such that the presence or absence of a person is detected by a human body sensor and a set temperature of an air conditioner which is performing the cooling operation is raised or illumination is turned off in a room where there is no person.

Hitherto, in the home network system, since only the limited appliances are connected to the network and the number, the kinds, and the installing places of the connected appliances are known upon construction, which appliances have been installed at which places in the house can be easily grasped without an aid of a computer system technique. In recent years, however, as the number of appliances installed in the house increases gradually, a technique for managing the installing positions is necessary. With such a background, how to set the installing positions of the appliances, such as on which floor, at which places, and in which room in the house they are set, is important. The following methods are used as methods of setting them by a computer system.

(1) In the home network system, installing positions information of the appliances which are installed in the house is set into each appliance by the construction trader or the user or set into an appliance for concentratedly managing those information. As setting methods, there are a method of setting them in a hardware manner like a dip switch, a method of setting them into software, and the like. However, according to all of those methods, they have to be manually set each time.

(2) In a radio network which is used in the home network system, for example, communication among the appliances is made via an access point which is installed every room and communication between the appliances located in the different rooms is made via a plurality of access points. Therefore, by examining via which access point the appliance is communicating, the installing position can be easily judged, regarding that the installing position of each appliance has been set in the same room as that of the access point.

(3) The method of calculating a distance between the appliances from a time difference that is caused until a response is made after a transmission message is transmitted has been disclosed in JP-A-5-48623.

However, according to the technique described in the above method (1), it is very troublesome for the user to execute the setting by himself. That is, it is needless to say that it is troublesome to set the installing position into each appliance. With respect to the technique described in the above method (2), as a medium of the network which is used in the home network system, it is not limited to a radio wave but an indoor wire, infrared rays, a telephone line, a twisted pair line, or the like is often used. There is, further, a case of forming one system by combining those plurality of media. It is insufficient according to the installing position obtaining method of appliances mainly using access points of the radio network. Even if appliances connected to different media exist, respectively, in the same room, it is difficult to recognize them. According to the example of the above method (3), although a length of transmission path of a physical network can be recognized, since it is not a physical straight line distance between the appliances, even if the transmission path length is known, it is difficult to discriminate an actual positional relation of the appliances. For example, in a detached house in which the appliances are connected by the indoor wire network, in most of the cases, the appliances in a plurality of rooms are connected by a single indoor wire in most of the cases. Even if the above technique is used, the room where the appliances have been installed cannot be discriminated on a room unit basis. According to such a technique, a network construction by a single transmission medium is considered as a prerequisite, and it cannot be used in a network construction environment comprising a plurality of transmission media.

That is, there is a problem such that it is difficult to automatically discriminate the installing positions of each appliance and obtain the position information irrespective of the network construction.

It is more difficult to discriminate the installing positions of each appliance by a remote control via the wide area network.

SUMMARY OF THE INVENTION

It is an object of the invention to provide a method of accumulating located states of appliances, whereby a relation among positions where the appliances are installed is accumulated from operation states, an operability of the appliance can be improved, and an electric power consumption can be reduced and to provide an apparatus using such a method.

The present invention has the following features.

(1) In a certain appliance in a distributed computer system in which a plurality of appliances are mutually connected through a network, state changes of other appliances are examined and differences among occurrence times of a plurality of state changes are calculated, thereby determining perspective of the installing positions of the appliances from the occurrence time differences. The state changes denote the number of times of the on/off operations of a switch, a time difference between the on/off operations, and the like.

(2) In the above feature (1), a weight is learned on the basis of the occurrence time differences of the state changes to which perspective degrees of the positions of the appliances have been weighted, and perspective of the installing position of the appliance is determined on the basis of a learning result.

(3) The functions of the above features (1) and (2) are provided for an apparatus for connecting a wide area network and a home network, thereby enabling obtained information to be used via the wide area network.

BRIEF DESCRIPTION OF THE DRAWINGS

FIG. 7 is a diagram showing an example of construction of a connected appliance information management table in the first embodiment;

FIG. 8 is a diagram showing an example of construction of a state change history management table;

FIG. 9 is a diagram showing an example of construction of a relationship management table;

FIG. 13 is a diagram showing an example of state where specific values have been stored in the relationship management table;

DETAILED DESCRIPTION OF THE EMBODIMENTS

Embodiments of the invention will now be described in detail hereinbelow.

Embodiment 1

Figure 1:
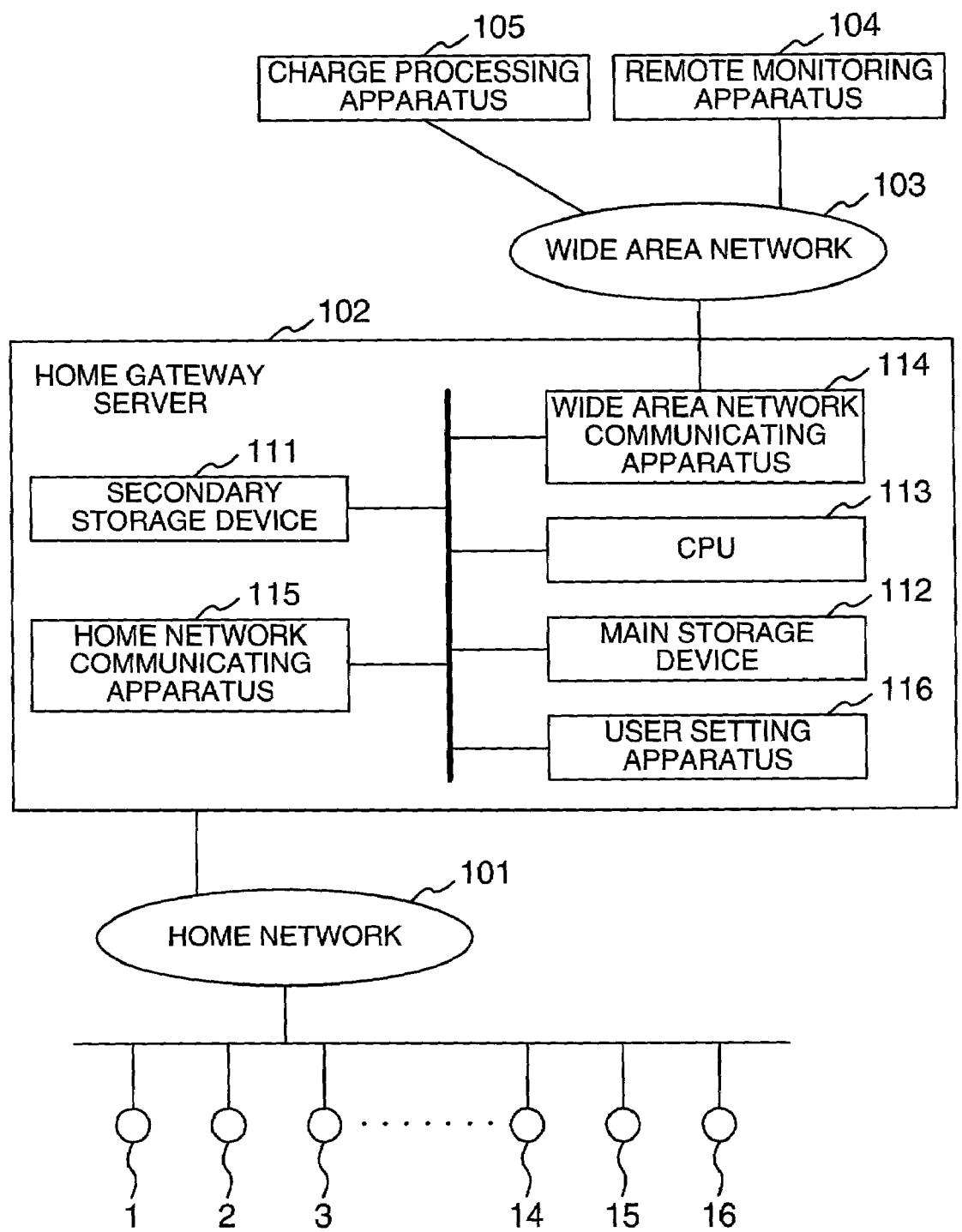
FIG. 1 shows an example of a whole construction of home network system to which the invention is applied.

A whole diagram and an appliance construction of one use form according to the invention are first shown by FIG. 1.

A home gateway server 102 is an appliance such as a personal computer or the like for discriminating and managing installing positions of appliances and comprises: a secondary storage device 111, a main storage device 112, a central processing unit (CPU) 113, a wide area network communicating apparatus 114, a home network communicating apparatus 115, and a user setting apparatus 116. A program which operates in the CPU 113, table information held by the program which is being operated, and the like are stored into the secondary storage device 111 and main storage device 112. The wide area network communicating apparatus 114 is connected to a wide area network 103 to which a remote monitoring apparatus 104 is connected. An arbitrary network such as optical fiber, radio wave, Internet and public telephone line can be used as a wide area network 103. The wide area network communicating apparatus 114 executes a communicating process with the remote monitoring apparatus 104. The user setting apparatus 116 is, for example, a display apparatus having a graphical user interface. The user setting apparatus 116 receives an input of various setting information from the user or displays information held in the home gateway server 102. The home network communicating apparatus 115 is connected to a home network 101 to which electric products such as lamps, air conditioners, and the like are connected. Reference numerals 1 to 16 denote appliances such as lamps, air conditioners, and the like which are located in a residence and electrically controlled. As a home network 101, an arbitrary network such as radio wave, indoor wire, infrared rays, coaxial line, twisted pair line, or the like can be used. A network obtained by combining them and can mutually communicate among the appliances can be also used. The home network communicating apparatus 115 executes a communicating process with the appliances 1 to 16. The remote monitoring apparatus 104 performs a remote monitoring of the home gateway server 102 and properly reads out the information held in the home gateway server 102.

Figure 2:
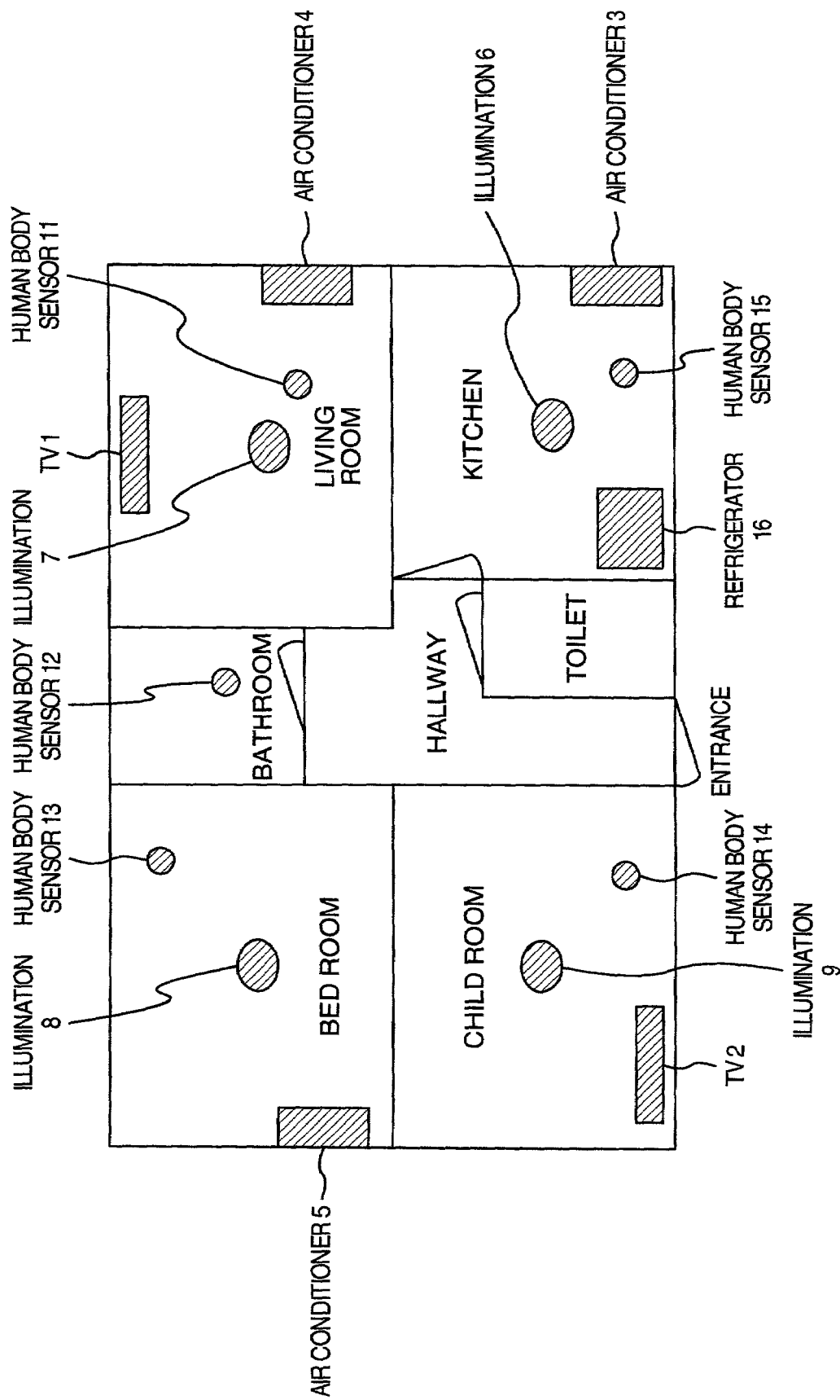
FIG. 2 shows a floor plan of an example of residence to which the home network system according to the invention is applied.

FIG. 2 schematically shows an example of floor plan of a residence and the home network system to which the invention is applied. The residence is a residence comprising resident spaces divided into a kitchen, a living room, a bed room, a child room, a bathroom, a toilet, a hallway, and an entrance. The residence is, further, a residence such that televisions 1 and 2, air conditioners 3 to 5, illuminations 6 to 9, human body sensors 11 to 15 for sensing the presence or absence of the human body, and a refrigerator 16 are located in each resident space. In FIG. 2, it is assumed that the appliances 1 to 16 correspond to reference numerals of the appliances shown in FIG. 1, have a communicating function, respectively, further, are mutually connected by the network installed in the residence, and can communicate with each other.

Figure 3:
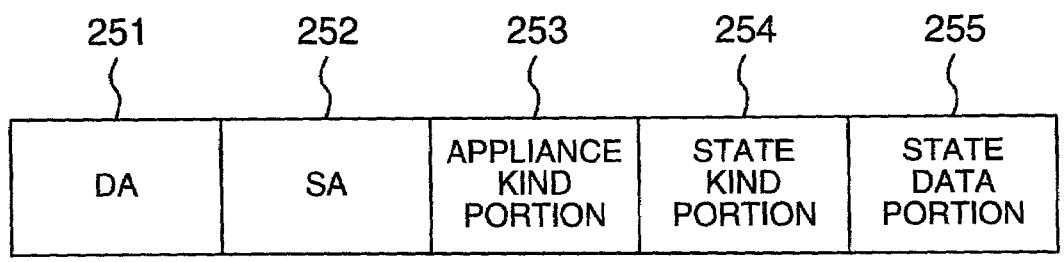
FIG. 3 is a diagram showing an example of a format of message which is transmitted via a home network.

FIG. 3 is a diagram showing an example of format of a message which is transmitted through the network. The message is constructed by: a DA (destination address) portion 251 in which a communication address of an appliance on the transmission destination side is stored; an SA (sending address) portion 252 in which a communication address of the appliance on a transmitting source side is stored; an appliance kind portion 253 in which an identifier indicative of a kind of appliance on the transmitting source side is stored; a state kind portion 254 in which a kind of state information of the appliance which is transmitted is stored; and a state data portion 255 in which the state information of the appliance is stored. The appliance kind identifier indicative of the kind of appliance stored into the appliance kind portion 253 is, for example, a value which has been predetermined in correspondence to the kind of appliance such as television, air conditioner, illumination, or the like. Although those identifiers are not particularly specified, they are determined in a manner such that "0×51" denotes the television, "0×52" indicates the air conditioner, "0×53" indicates the illumination, and the like. The information stored into the state data portion 255 will be explained hereinlater. The message format shown in FIG. 3 indicates a format of a response message which is returned to the appliance on the requesting source side in response to a request message for inquiring the designated appliance and the designated state kind from a certain appliance among messages which are transmitted and received among the appliances and a broadcast message format in case of broadcasting the state information of the appliance with the state change from this appliance to the network.

Figure 4:
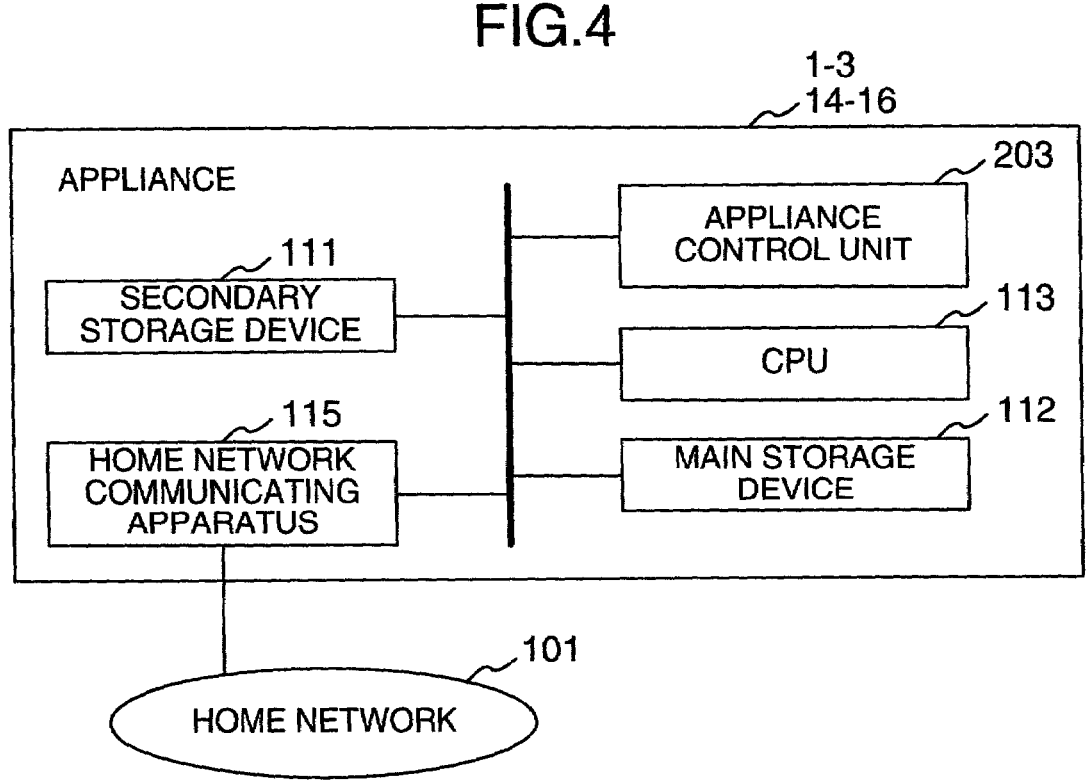
FIG. 4 is a block diagram showing an example of internal construction of an appliance in a first embodiment.

FIG. 4 is a block diagram showing an internal construction of the appliance 1. The appliance 1 comprises the secondary storage device 111, main storage device 112, central processing unit (CPU) 113, home network communicating apparatus 115, and an appliance control unit 203. Each of the appliances 2 to 16 also has a construction similar to that mentioned above. The CPU 113 executes the following processes in accordance with the program stored in the main storage device.

The CPU returns state information (which will be explained hereinlater) of its own appliance held by itself to the appliance on the requesting source side or broadcasts the state information of its own appliance in response to a request from another appliance. The state information of its own appliance is obtained from the appliance control unit 203 and, for example, in case of a human body detecting sensor, it indicates ON/OFF information of the sensor or the like. When there is a change in state information of its own appliance, the CPU outputs a transmitting request of the state information to the home network. The CPU also executes a peculiar process every kind of appliance. For example, in case of the television, a TV control is made. In case of the air conditioner, an air conditioner control is made. In case of the illumination, an illumination control is made. As states of its own appliance mentioned above, there are various states such as ON/OFF information and channel information of a television in case of the television, setting temperature information, present temperature information, operating mode information, and the like in case of the air conditioner, and the like in accordance with the kinds of appliances. To enable a spirit of the invention to be easily understood, it is defined that the state information of its own appliance is as follows. Therefore, the following state information is held, the state information is returned through the home network 101 in response to a request from another appliance in accordance with the message based on the message format described in FIG. 3, or the state information is broadcasted to the home network 101 at timing when the state changes. The appliance control unit 203 controls appliance peculiar hardware concerned with the foregoing state information that is peculiar to the appliance. The state information is shown below.

(1) State information of the TV:
  Power ON/OFF state, channel state, and sound volume state
(2) State information of the air conditioner:
  Power ON/OFF state, operating mode state, setting temperature state, setting wind amount state, and timer setting state
(3) State information of the illumination:
  Illumination ON/OFF state
(4) State information of the human body sensor:
  Presence/absence state of detection of the human body
(5) State information of the refrigerator:
  Opening/closing state of a door That is, all of the above-mentioned examples relate to the states of the appliance which are changed in dependence on the existence of a person. In the invention, the installing position of the appliance is discriminated by using those state information.

Figure 5:
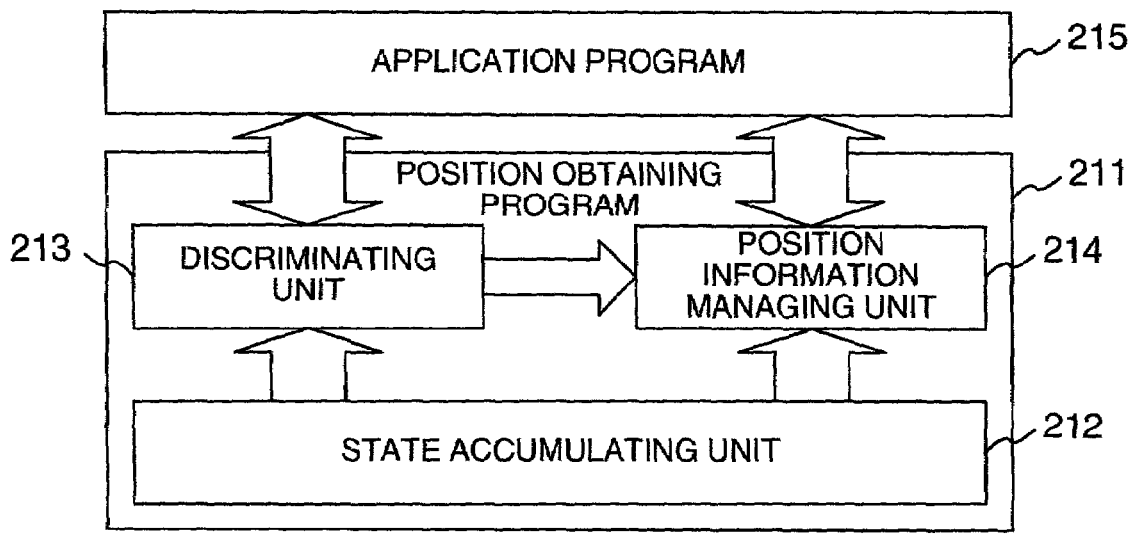
FIG. 5 is a block diagram showing an example of internal construction of home gateway server.

FIG. 5 is a block diagram showing an example of construction of a processing program stored into the main storage device 112 of the home terminal equipment 102. The home gateway server 102 comprises: a state accumulating unit 212, a discriminating unit 213, and a position information managing unit 214 included in a position obtaining program 211; and an application program 215. The state accumulating unit 212 accumulates the state information of other appliances through the home network communicating apparatus 115 and transfers it to the discriminating unit 213. The discriminating unit 213 holds the kinds and the number of appliances existing in the residence from the state information of other appliances transferred by the state accumulating unit 212 and discriminates a mutual relationship among the appliances regarding the installing position of the appliance. The relationship will be described in detail hereinlater. The position information managing unit 214 discriminates the number of and the kinds of rooms in the residence from the relationship information of the installing positions among the appliances determined by the discriminating unit 213. The application program 215 is a program for controlling the appliances in the residence.

Figure 6:
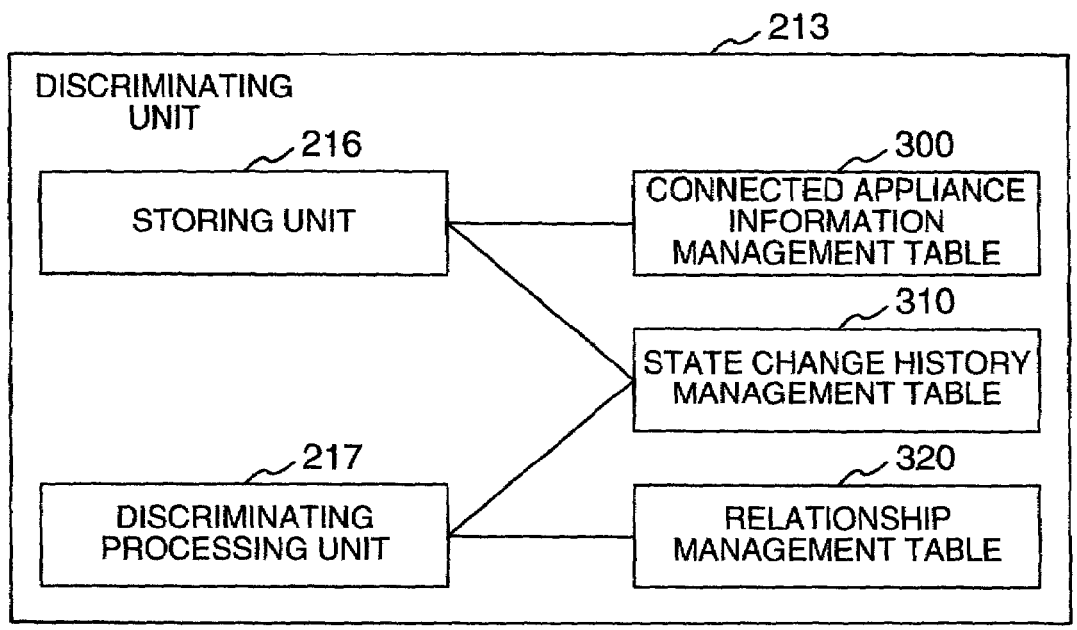
FIG. 6 is a block diagram showing an example of internal construction of a discriminating unit.

The discriminating unit 213 will now be described. FIG. 6 is a block diagram showing an example of internal construction of the discriminating unit 213. The discriminating unit 213 comprises: a connected appliance information management table 300; a state change history management table 310; a relationship management table 320; a storing unit 216; and a discrimination processing unit 217.

The connected appliance information management table 300 is a table for managing which kinds of appliances are connected to the home network 101. FIG. 7 shows an example of construction of such a table. As shown in FIG. 7, the connected appliance information management table 300 comprises: an appliance address portion 301 in which communication addresses of the appliances connected to the network are stored; and an appliance kind portion 302 in which appliance kind identifiers indicative of the kinds of appliances are stored. The table 300 holds those information with respect to each appliance connected to the network.

The state change history management table 310 is a table for holding a history of the state information accumulated from other appliances and FIG. 8 shows an example of a construction of such a table. The state change history management table 310 is used as a ring buffer and comprises: a time portion 311 in which times when the state information was received from other appliances are stored; and an appliance address portion 312 in which appliance addresses of the appliances are stored.

The relationship management table 320 is a table for managing relationship weight information showing a degree of nearness of the installing positions of the appliances connected to the home network 101 by numerical values and FIG. 9 shows an example of construction of such a table. The relationship management table 320 is constructed in a manner such that with respect to all of the appliances connected to the home network 101, the relationship weight information among all of the other appliances can be stored. Communication addresses of all of the appliances are listed up in both of the rows and columns of the relationship management table 320. In a column at which a certain row and a certain column intersect, the relationship weight information between the appliance of the row and the appliance of the column is stored. For example, the relationship weight information between the air conditioner 3 and the television 2 is stored into a portion surrounded by an ellipse in FIG. 9. With respect to the value of the relationship weight information, a time difference at the time when the state change occurs between the appliances located at near positions is short and, further, their frequencies are large, and this degree is expressed as a numerical value. For example, it can be calculated by the following equation. As the value is larger, it is possible to presume that the installing position of this appliance is closer. With reference to FIG. 9, if the value of the relationship weight information between a specific appliance located at the intersecting position of the row and the column and the appliance is larger than the value of the relationship weight information between another appliance and the appliance, this means that the specific appliance exists in the same room. If the former value is smaller than the latter value, this means that those appliances exist in the different rooms.

$$a \times \text{(the number of times of occurrence of state change of both appliances)} + b \times \Sigma(1/\text{time difference}) \quad (1)$$

In the equation (1), a: parameter for weighting to attach importance to the number of times of occurrence of state change of both appliances; decimal or positive number b: parameter for weighting to attach importance to the time difference; decimal or positive number $$(0 \leq a \leq 1, b = 1 - a)$$

With reference to FIG. 6, the storing unit 216 executes a process for forming the information stored into the connected appliance information management table 300, state change history management table 310, and relationship management table 320 from the state information received from the state accumulating unit 212 and storing them. That is, the present time and the appliance address are additionally stored into the last of the state change history management table 310 used as a ring buffer. Whether the appliance address of the appliance on the transmitting source side of the state information has been stored in the connected appliance information management table 300 or not is discriminated. If it is not stored, that is, the appliance address and the appliance kind identifier of the newly installed appliance are additionally stored into the connected appliance information management table 300. The appliance address of this appliance is additionally stored into the row and column in the relationship management table 320.

The discrimination processing unit 217 periodically activates (it is assumed hereinbelow that it is activated at a period of 5 seconds) and executes a process for calculating relationship weight information in the relationship management table 320 from the times and appliance addresses stored in the state change history management table 310 (a calculating method will be explained hereinlater) and storing it. The unit 217 also executes a process for deleting the times and appliance addresses of a predetermined time before in the state change history management table 310.

Figure 10:
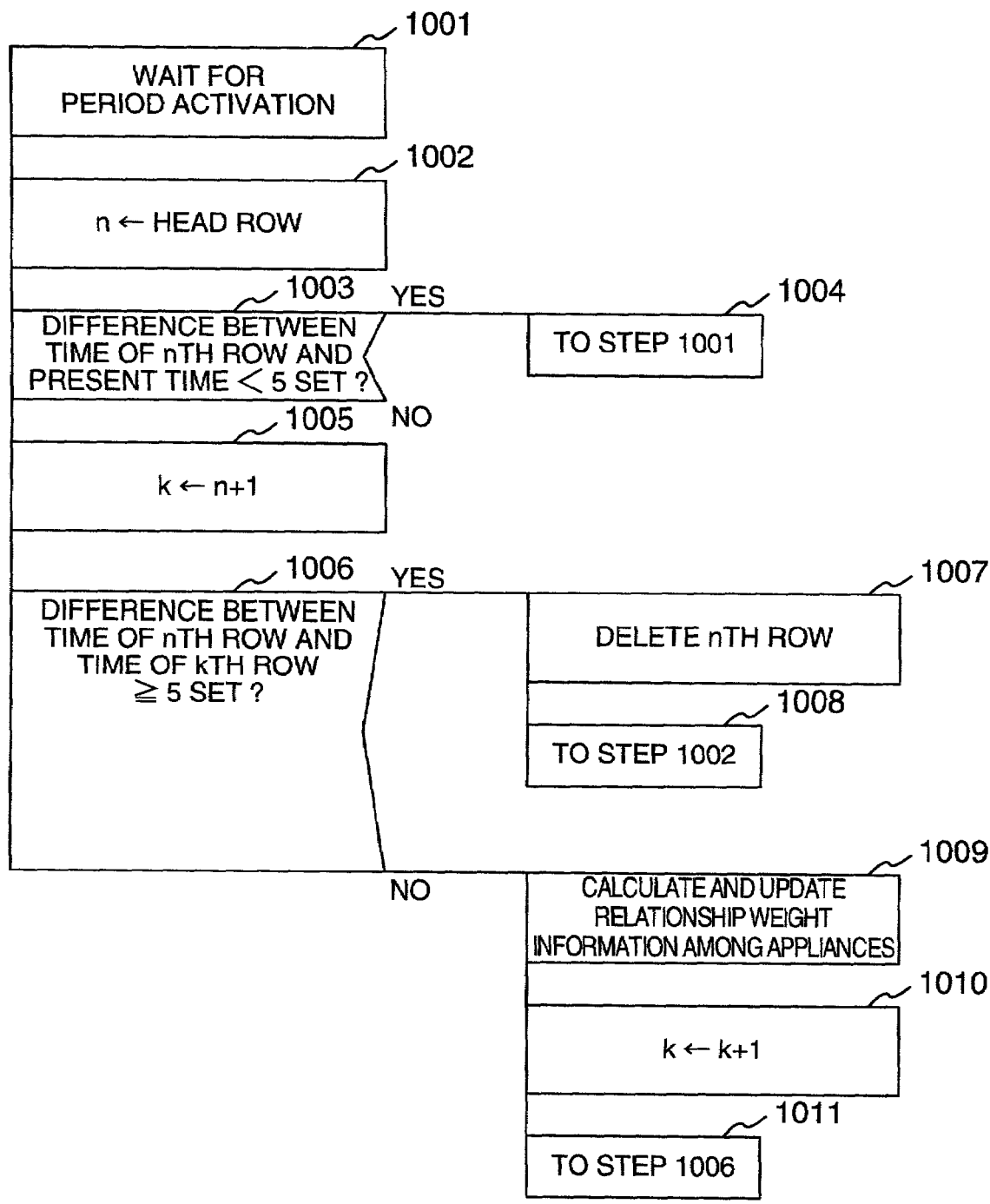
FIG. 10 is a PAD diagram showing an example of processes of a discrimination processing unit.

FIG. 10 shows an example of processes executed by the discrimination processing unit 217. When the discrimination processing unit 217 activates, it first substitutes the number of the head row in the state change history management table 310 used as a ring buffer into a variable n (step 1002). If a difference between the time of the head row n and the present time is less than 5 seconds (YES: step 1003), the processing routine advances to the following process. If it is longer than 5 seconds, the processing routine finishes and the apparatus returns to a period activation waiting mode (step 1001) (step 1004). Subsequently, the discrimination processing unit 217 substitutes a value which is larger than the head row number n by "1" into a variable k (step 1005) and calculates a time difference between the head row n and the next row k, that is, performs a subtraction between the previous and post times shown in FIG. 8. If it is equal to or longer than 5 seconds (YES: step 1006), the head row n is deleted (step 1007) and the processing routine returns to step 1002 (step 1008). If it is shorter than 5 seconds (NO: step 1006), the relationship weight information corresponding to each of the appliance addresses stored in the rows n and k is updated and stored into the relationship management table 320 (step 1009). k is incremented (step 1010) and the processing routine returns to step 1006 (step 1011). In a process in step 1009, for example, a mean value of the value of the relationship weight information stored in the column corresponding to the relationship management table 320 and a reciprocal number of the above time difference is calculated and the relationship weight information is updated to this value, that is, it is rewritten to a more accurate value. This means that a process for calculating the relationship weight information on the basis of a calculating equation on the assumption that a=0 and b=1 in the foregoing equation (1). The assumption of (a=0 and b=1) denotes that a value of the relationship weight information is calculated only with respect to the time difference. For example, assuming that a=0.1 and b=0.9, importance is attached to b the nine times rather than a. When importance is attached to a, this means that, for example, in an appliance such as an illumination which is frequently turned on/off, a corresponds to the number of ON/OFF operating times. When importance is attached to b, this means that, for example, in an appliance such as an air conditioner, it is a value which corresponds to a time such as an operating time or the like merely by controlling it after a power switch was once turned on.

By the processes of the discriminating unit 213 described above, which kinds of appliances are connected to the network is discriminated and its information is stored into the connected appliance information management table 300. A magnitude of the relationship among those appliances is discriminated and its discrimination information is stored into the relationship management table 320. Processes for obtaining further new information by using those information will be described hereinbelow.

Figures 11, 12:
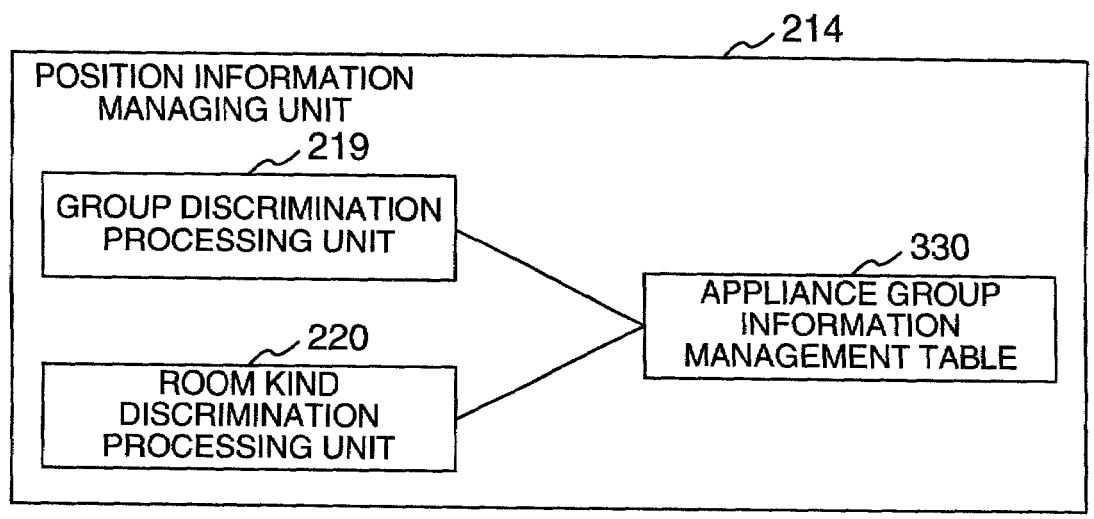
FIG. 11 is a diagram showing an example of internal construction of a position information managing unit.
FIG. 12 is a diagram showing an example of construction of an appliance group information management table.

The position information managing unit 214 will now be described. FIG. 11 is a block diagram showing an internal construction of the position information managing unit 214. The position information managing unit 214 comprises: an appliance group information management table 330; a group discrimination processing unit 219; and a room kind discrimination processing unit 220. A result obtained by grouping the appliances connected to the network on the basis of the magnitude of the relationship is stored in the appliance group information management table 330 and information regarding those groups is stored.

FIG. 12 shows an example of a construction of the appliance group information management table 330. The appliance group information management table 330 is constructed by columns for storing an appliance group 331, an appliance address list 332, and a room kind 333. A logical identifier of the group, that is, an identifier which has unconditionally been allocated in the appliance 1 is stored in the appliance group 331. The addresses of the appliances which belong to the corresponding group are stored in the appliance address list 332. An identifier corresponding to the kind of room which has been determined such that the appliance group belongs to it is stored in the room kind 333.

In FIG. 11, the group discrimination processing unit 219 groups the appliances on the basis of the values of the relationship weight information stored in the relationship management table 320 held by the discriminating unit 213 and stores a grouping result into the appliance group information management table 330. Specifically speaking, the following processes are executed. The group discrimination processing unit 219 is periodically activated and checks the column in which the value of the relationship weight information stored in the relationship management table 320 held by the discriminating unit 213 is equal to or larger than a certain value (assumed to be a boundary value). It is determined that the appliances corresponding to the row and the column of the column of the value of the boundary value or more belong to the same group. Now, in the case where the values as shown in FIG. 9 have been stored, when the boundary value is assumed to be equal to 0.5, the checked columns are columns shown by bold frames in FIG. 13. It is determined that the appliances of the same group as that of the television 1 are the air conditioner 4 and the illumination 7. It is determined that the appliances of the same group as that of the air conditioner 3 are the illumination 6 and the refrigerator 16. An identifier is allocated to each group and the addresses of the appliances constructing such a group are stored into the appliance group 331 and appliance address list 332 in the appliance group information management table 330. By the above processes, the correspondence of the appliance addresses belonging to the group is discriminated and its discrimination information is stored into the appliance group information management table 330.

Subsequently, the room kind discrimination processing unit 220 confirms the kind of appliance by using the address with reference to the appliance address list 332 in the appliance group information management table 330, thereby discriminating the room where the appliance group exists. For example, it is now determined that the group accumulating information of a refrigerator as an application kind belongs to an appliance group of appliances located in the kitchen. As mentioned above, the installing room kind of the appliance group is discriminated on the basis of the correlation between the kind of room and the kinds of appliances.

The application program 215 shown in FIG. 5 fetches the information of the installing positions obtained by the method as described above and uses it for the own processes.

The application program 215 will now be described. In the application program 215, specifically speaking, for example, on the basis of the information of the appliance kinds and the number of appliances which are held in the discriminating unit 213 and the number of rooms in the residence and the room kind which are held in the position information managing unit 214, the floor plan in the residence, the room kind, and the installing appliances are displayed. If the sensor fails, the failed sensor is detected from a number of sensors attached in the house and the location of the failed sensor is displayed. While heating apparatuses such as air conditioner, hot carpet, and the like installed in the same room cooperatively suppress an electric power consumption, a heating control of the room is effectively made. In FIG. 2, when the application program makes a control for turning off the illumination in a room where there is no person, combinations of the human body detecting sensors and the illuminations which exist in the same room is discriminated from the human body detecting sensors 11 to 15 and illuminations 6 to 9 are discriminated on the basis of the state information regarding the appliance group obtained from the position information managing unit 214 and the appliance kind information obtained from the discriminating unit 213 and the decided combination is held. While monitoring the states of the human body detecting sensors, the ON/OFF control of the illuminations is made in accordance with the states. In case of the embodiment, as combinations of the illuminations and the human body detecting sensors, four kinds of combinations of (the illumination 6 and human body detecting sensor 15), (the illumination 7 and human body detecting sensor 11), (the illumination 8 and human body detecting sensor 13), and (the illumination 9 and human body detecting sensor 14) are obtained and held. If the absence of the person is detected by the human body detecting sensor 15, the control to turn off the illumination 6 corresponding thereto is made.

Another example of the application program 215 will now be described. The application program 215 executes processes for receiving a reading request of the information held in the position obtaining program 211 from the wide area network communicating apparatus 114, reading out the information corresponding to it from the position obtaining program 211, and responding it to a reading source side via the wide area network communicating apparatus 114. At this time, a charging process is executed in accordance with an amount of read-out information. For example, the counting operation for charging 10 yen per reading time, 10 yen per 100 bytes, or the like is performed. A charging result is responded and returned, for example, by a request from a charge processing apparatus 105. The charge processing apparatus 105 charges an administrative trader or the like of the remote monitoring apparatus 104 in accordance with the read-out value. Although only one remote monitoring apparatus is shown in FIG. 1, a plurality of remote monitoring apparatuses can be also provided. The application program 215 can also individually process the charge every remote monitoring apparatus. When a plurality of users use the remote monitoring apparatus 104, the charge can be also individually processed every user. It is also possible to construct the apparatus in a manner such that if the user is the user of a home which is managed by the home terminal equipment (outdoor user), the charge is not made. The application program 215 can also manage setting information for distinguishing information which can be opened to the remote monitoring apparatus 104 from information which cannot be opened by an input from the user setting apparatus 116. For example, it is also possible to construct the apparatus in a manner such that the setting of the opening/non-opening of the appliance unit such that although the information regarding the appliance 1 can be opened, the information regarding the appliance 3 is not opened, or the like is managed and, when the reading request is issued, the opening/non-opening is judged on the basis of the setting. The information regarding the opening/non-opening can be also finely set and managed every remote monitoring apparatus on the communication destination side or every user.

Although the embodiment of the present invention has been described above with respect to the example, the construction and processes which are executed can be variably changed.

For example, although the home terminal equipment 102 such as a personal computer or the like has the function for discriminating the installing positions in the above description, the household appliances and facility appliances such as air conditioners, illuminations, refrigerator, human body sensors as appliances 1 to 16 can also have such a function.

Although a detecting period in the discrimination processing unit 217 has been set to 5 seconds, a different value can be also used. It is also possible to provide a plurality of detecting periods in the discrimination processing unit 217 and discriminate the level of the appliance group. That is, for example, the group can be also formed like a layer in accordance with a level of nearness, such as group of the appliances located at positions where the time difference of the state changes is equal to about 3 seconds, group of the appliances located at positions where it is equal to about 6 seconds, group of the appliances located at positions where it is equal to about 10 seconds, and the like. In this case, such a construction can be realized by grouping the tables described above every detecting period and executing the discriminating process for each group.

Although the embodiment has been described above on the assumption that the application program 215 and position obtaining program 211 exist on the same home terminal equipment, they can also exist on the different home terminal equipment. In this case, it is assumed that the position obtaining program 211 and application program 215 can mutually communicate through the home network 101.

Embodiment 2

Although the embodiment 1has been described on the assumption that the appliances are grouped on the basis of the installing positions, the embodiment 2 will be described with respect to an example of specifying in which room the grouped appliances have been located. The embodiment 2 will be described with respect to only portions different from those in the embodiment 1.

Figures 14, 15:
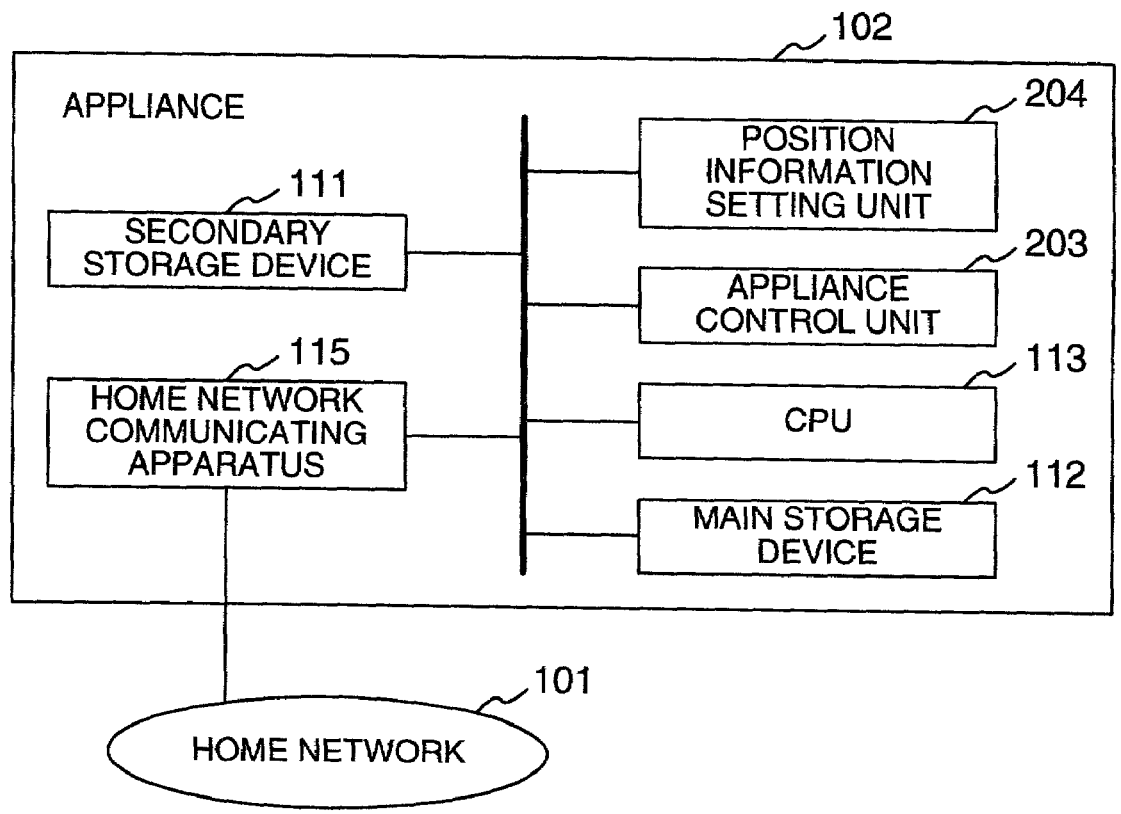
FIG. 14 is a block diagram showing an example of internal construction of an appliance in a second embodiment.
FIG. 15 is a diagram showing an example of construction of a connected appliance information management table in the second embodiment.

FIG. 14 is a modification of the block diagram showing the internal construction of the appliance 1 shown in FIG. 4 in the embodiment 1, and a position information setting unit 204 is added. The position information setting unit 204 executes a process for setting and holding position information for allowing the user to specify the installing positions of the appliances. The user executes this setting process by using, for example, a dip switch or the like. The position information to specify the installing positions is information such that if a value of the dip switch is equal to "1", the installing position can be regarded as a kitchen and, if it is equal to "2", the installing position can be regarded as a living room. It is not always necessary to provide the position information setting unit 204 for all of the appliances and there will be no problem even if all of the appliances have the position information setting unit 204. The position information setting unit 204 is provided to raise a specific precision of the kind of room where the appliances have been located and it is sufficient that only a part of the appliances do not have the position information setting unit 204. The position information which was set here is read by the program which is processed by the CPU 113 and, for example, periodically broadcasted to other appliances through the home network communicating apparatus 115. As a message which is transmitted in this instance, for example, it is possible to use a message obtained by storing an identifier indicating that the present message is the position information into the state kind portion 254 of the message shown in FIG. 3 and by storing the position information read out from the position information setting unit 204 into the state data portion 255.

In the home gateway server 102 on the reception side, when the message is received, the position information is stored into the connected appliance information management table 300 of the discriminating unit 213. An area where it is stored is a position information portion 303 as shown in FIG. 15 obtained by expanding FIG. 7. The information stored in the connected appliance information management table 300 is used for the process which is executed by the room kind discrimination processing unit 220 in the position information managing unit 214 and the kind of room is discriminated. Since the position information is not always sent from all of the appliances 1 to 16, the kind of room is determined by presuming it from the segment position information.

Figure 16:
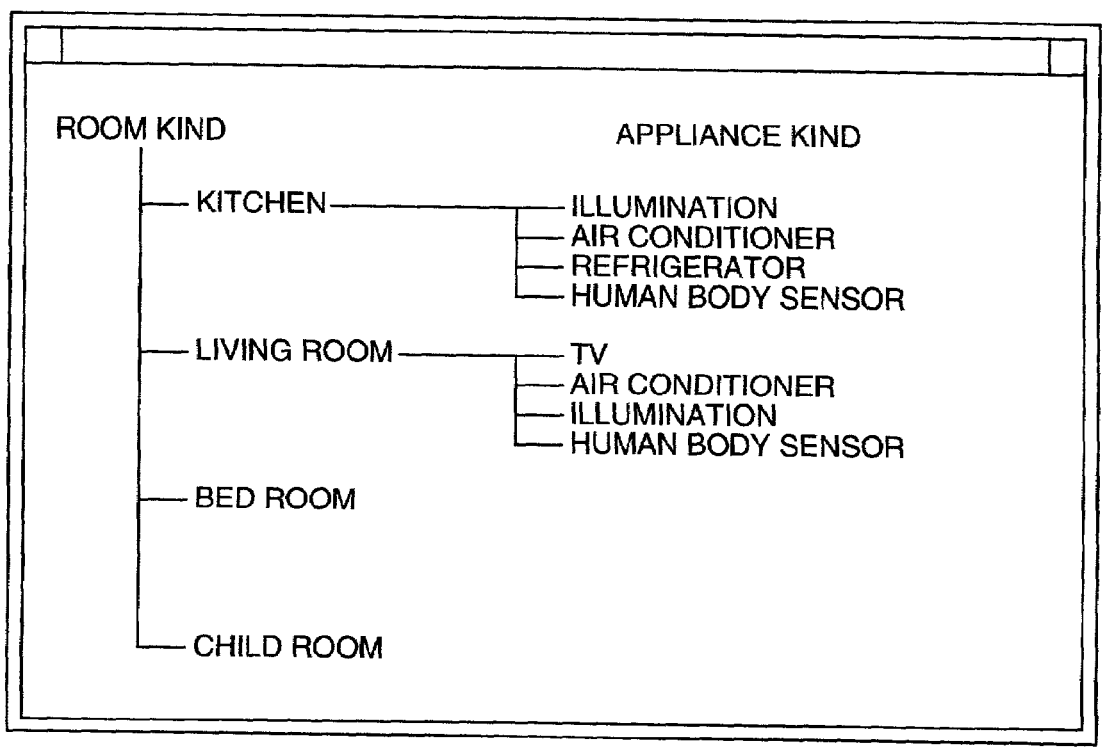
FIG. 16 is a diagram showing an example in which obtained installing position information is displayed on a screen.

If the application program 215 on the home gateway server 102 has, for example, a function for displaying the kind of room and the kinds of appliances located there, by reading out the contents in the connected appliance information management table 300 and appliance group information management table 330, the installing rooms of the appliances installed in the house and the appliances in each room as shown in FIG. 16 are graphically displayed.

In the embodiment of the invention described above, a certain appliance in the distributed computer system in which a plurality of appliances are mutually connected through the network checks the state changes of other appliances, calculates the difference of the occurrence times of the state changes in a plurality of appliances, accumulates the difference of the occurrence times, and determines the nearness of the position of the appliance from the occurrence time difference, thereby discriminating the installing positions of the appliances. In a system for notifying the state change by a broadcasting method or the like at the occurrence timing of the state change by using the occurrence time difference of the state changes as a reference for evaluating the nearness, the nearness degree of the installing position of the appliance to be subjected to the discrimination of the nearness degree of the installing position can be discriminated without inquiring all of the appliances about the states by polling so long as the state change notification to be broadcasted was received.

The nearness degrees of the positions among a plurality of appliances are expressed by weights. By updating the weights on the basis of the occurrence time difference of the state changes, thereby learning, and the nearness of the appliance positions is determined on the basis of a learning result. Thus, precision of the nearness degree to be discriminated becomes higher.

By grouping the appliances on the basis of the nearness among the appliances, for example, the installing positions of the appliances can be discriminated on a room unit basis. The number of rooms in the house is discriminated on the basis of the group and the kind of room where each appliance has been located is discriminated. Consequently, among the appliances located at random in the house, in which room appliances have been located can be automatically discriminated. There is no need for the user to set them.

Since the installing positions can be found as mentioned above, for example, in the case where the sensor fails, the position of the failed sensor can be quickly and easily found from a number of sensors attached in the house. For example, in the case where the user wants to effectively warm the room while the heating apparatuses such as air conditioner, hot carpet, and the like installed in the same room cooperatively suppress an electric power consumption, it is necessary to find the appliance serving as a cooperative partner located in the same room. In such a case, the partner cooperative appliance can be searched by the method of the invention.

Since the installing positions of the appliances can be found by the method as mentioned above, in the case where the sensor fails, the position of the failed sensor can be quickly and easily found from a number of sensors attached in the house. Since the appliances can be classified every room, for example, it is possible to effectively use the invention for the energy saving control such that the presence or absence of a person is detected by a human body sensor and a set temperature of an air conditioner which is performing the cooling operation is raised or illumination is turned off in a room where there is no person.

By providing the foregoing function for the home terminal equipment connected to the wide area network, the remote monitoring apparatus can also use the obtained information via the wide area network. The information can be individually opened to each monitoring apparatus or user without opening all of the information. Further, the information obtained by performing the charging process can be handled as goods.

Although the embodiments have been described with respect to the house as an example, the invention can be also applied to an office building, a stadium, port harbor facilities, a chemical plant, and the like.

It will be further understood by those skilled in the art that the foregoing description has been made on embodiments of the invention and that various changes and modifications may be made in the invention without departing from the spirit of the invention and scope of the appended claims.

What is claimed is:

1. An appliance located-states accumulating method of accumulating data of a positional relation of individual positions where a plurality of appliances mutually connected through a network are located, comprising:
   (a) receiving different classes of state change information from a plurality of different classes of appliances through said network, the state change information being indicative of differing classes of operating state changes of the different classes of appliances;
   (b) calculating an occurrence time difference from occurrence times when the differing classes of operating state changes have been detected as having occurred with respect to differing appliances of the differing classes of appliances, in accordance with occurrence time information indicative of occurrence times of the operating state changes included in the state change information; and
   (c) acquiring distance between appliances which incur the operating state changes, based on the calculated occurrence time difference;
   wherein said acquiring calculates the positional relation in accordance with the occurrence time difference of the operating state changes occurred in two appliances and relationship weight information indicative of a distance between the two appliances; and
   wherein said relationship weight information is a value calculated by a predetermined expression in accordance with two elements including: number of times of occurring the operating state changes; and the occurrence time difference of the operating state changes occurred in the two appliances.

2. An apparatus cooperative with a plurality of appliances mutually connected through a network and for accumulating data of a positional relation of individual positions where the appliances are located, comprising:
   a reception means for receiving different classes of state change information from a plurality of different classes of appliances through said network, the state change information indicating operating state changes of the different classes of appliances,
   calculation means calculating an occurrence time difference from occurrence times when the different classes of operating state changes have been detected as having occurred with respect to differing appliances of the differing classes of appliances, in accordance with occurrence time information indicative of occurrence times of the operating state changes included in the state change information; and
   acquiring means acquiring a distance between appliances which incur the operating state changes, based on the calculated occurrence time difference;
   wherein said acquiring means calculates the positional relation in accordance with the occurrence time difference of the operating state changes occurred in two appliances and relationship weight information indicative of a distance between the two appliances; and,
   wherein said relationship weight information is a value calculated by a predetermined expression in accordance with two elements including: number of times of occurring the operating state changes; and the occurrence time difference of the operating state changes occurred in the two appliances.

3. An apparatus according to claim 2, comprising storing means for Storing the occurrence time difference of the operating state changes occurred in the two appliances and the relationship weight information indicative of the distance between the two appliances.

4. A household-appliance located states accumulating method of accumulating data of a positional relation of individual positions where a plurality of household appliances mutually connected throughout a household are located, comprising:
   (a) receiving different classes of state change information from a plurality of different classes of appliances through said network, the state change information being indicative of differing classes of operating state changes of the household appliances, where the operating state changes occur responsive to interaction of a person in the household in proximity of ones of the household appliances;
   (b) calculating occurrence time differences from occurrence times when the differing classes of operating state changes have been detected as having occurred with respect to differing appliances of the differing classes of appliances, in accordance with occurrence time information indicative of occurrence times of the operating state changes included in the state change information; and
   (c) acquiring distance between household appliances which incur the operating state changes in the household, based on the calculated occurrence time differences;
   wherein said acquiring calculates the positional relation in accordance with the occurrence time difference of the operating state changes occurred in two appliances and relationship weight information indicative of a distance between the two appliances; and,
   wherein said relationship weight information is a value calculated by a predetermined expression in accordance with two elements including: number of times of occurring the operating state changes; and the occurrence time difference of the operating state chances occurred in the two appliances.

5. A system constituted of a plurality of household appliances mutually connected through a network throughout a household, and for accumulating data of a positional relation of individual positions where the household appliances are located in the household, comprising:
   a reception means for receiving different classes of state change information from a plurality of different classes of appliances through said network, the state change information indicating differing classes of operating state changes of the different classes of household appliances, where the operating state changes occur responsive to interaction of a person in the household in proximity of the household appliance;

calculation means calculating occurrence time differences from occurrence times when the differing classes of operating state changes have been detected as having occurred with respect to differing appliances of the differing classes of appliances, in accordance with occurrence time information indicative of occurrence times of the operating state changes included in the state change information; and acquiring means acquiring a distance between household appliances which incur the operating state changes in the household, based on the calculated occurrence time differences;

wherein said acquiring means calculates the positional relation in accordance with the occurrence time difference of the operating state chances occurred in two appliances and relationship weight information indicative of a distance between the two appliances; and, wherein said relationship weight information is a value calculated by a predetermined expression in accordance with two elements including: number of times of occurring the operating state changes; and the occurrence time difference of the operating state changes occurred in the two appliances.

6. A system according to claim 5, comprising storing means for storing the occurrence time difference of the operating state changes occurred in the two household appliances and the relationship weight information indicative of the distance between the two household appliances.

* * * * *